United States Patent
Tausanovitch

(10) Patent No.: US 6,457,695 B1
(45) Date of Patent: Oct. 1, 2002

(54) STAND FOR GASOLINE LINE TRIMMERS

(76) Inventor: Dusan Tausanovitch, R.R. 1 Box 41 BB, Orford, NH (US) 03777

( * ) Notice: Subject to any disclaimer, the term of this patent is extended or adjusted under 35 U.S.C. 154(b) by 0 days.

(21) Appl. No.: 09/642,053

(22) Filed: Aug. 21, 2000

(51) Int. Cl.[7] .............................. A47F 7/00; F16M 13/00
(52) U.S. Cl. .................... 248/676; 248/176.1; 211/60.1
(58) Field of Search ................................. 248/127, 147, 248/154, 176.1, 676, 680, 681; 172/438; 70/61, 62; 42/94; 211/60.1, 70.6, 64

(56) References Cited

U.S. PATENT DOCUMENTS

| | | | | |
|---|---|---|---|---|
| 2,661,172 A | * | 12/1953 | Needham | 248/671 |
| 2,667,274 A | * | 1/1954 | Diebold | 211/64 |
| 3,036,828 A | * | 5/1962 | Van Fleet | 269/296 |
| 3,477,586 A | * | 11/1969 | Haluska | 211/64 |
| 3,767,093 A | * | 10/1973 | Pinkerton et al. | 211/64 |
| 3,876,076 A | * | 4/1975 | Hazelhurst | 211/4 |
| 3,913,746 A | * | 10/1975 | Burton | 211/64 |
| 4,009,853 A | * | 3/1977 | Lile | 248/201 |
| 4,132,315 A | * | 1/1979 | Young | 211/64 |
| 4,150,806 A | * | 4/1979 | Dziuk | 248/154 |
| 4,531,701 A | * | 7/1985 | Treu | 248/676 |
| 4,873,777 A | * | 10/1989 | Southard | 42/94 |
| D313,886 S | * | 1/1991 | Southard | D3/38 |
| 5,676,257 A | * | 10/1997 | Adkins | 211/64 |
| 5,697,181 A | * | 12/1997 | Savant | 42/94 |

* cited by examiner

Primary Examiner—Ramon O. Ramirez
Assistant Examiner—Jon Szumny

(57) ABSTRACT

A supporting stand equipped with relockable seats used to hold gas powered line trimmers in an elevated position, keeping engine with starter rope upward and head with cutting cords above the ground. This facilitates engine starting operations and eliminates possible hazards created by fast rotation of cutting cords during the above operation. In addition stand has a built in provision to keep trimmer in a position with vertically oriented gasoline tank suitable for fueling. Also the stand is convenient to be used for transportation and storage of the trimmer.

5 Claims, 2 Drawing Sheets

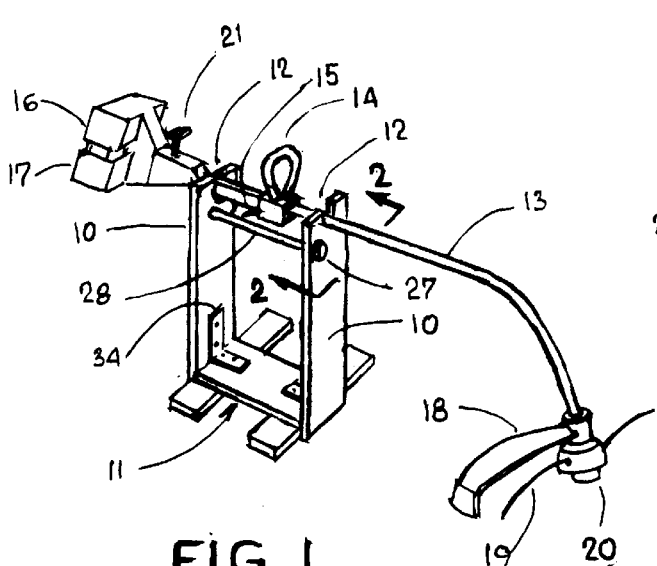
FIG. 1
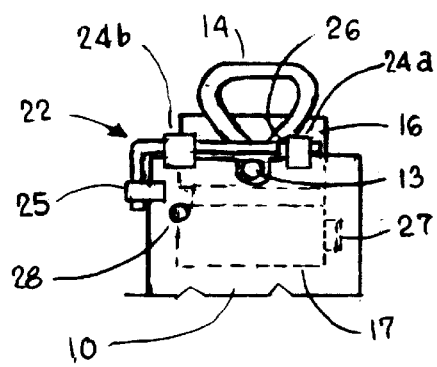
FIG. 2
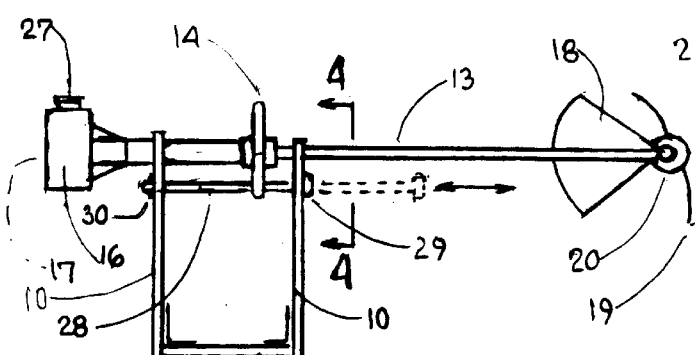
FIG. 3
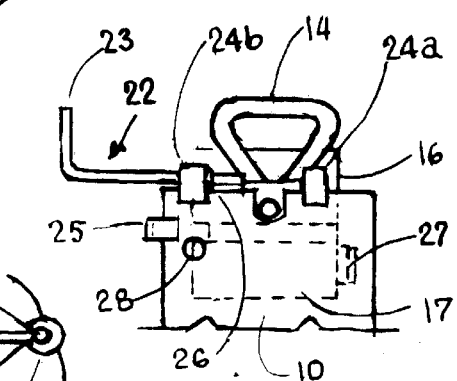
FIG. 2a
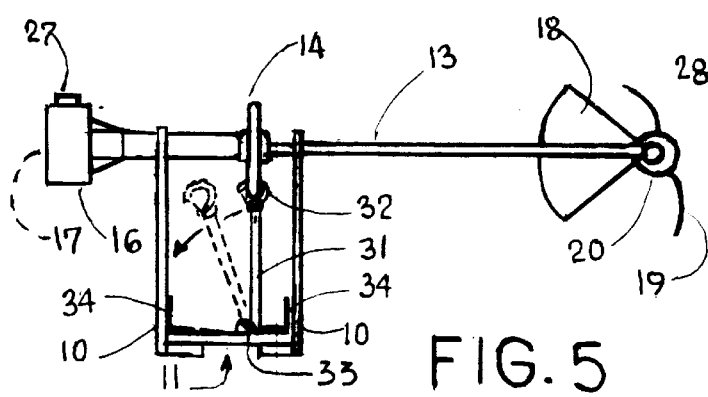
FIG. 5
FIG. 4

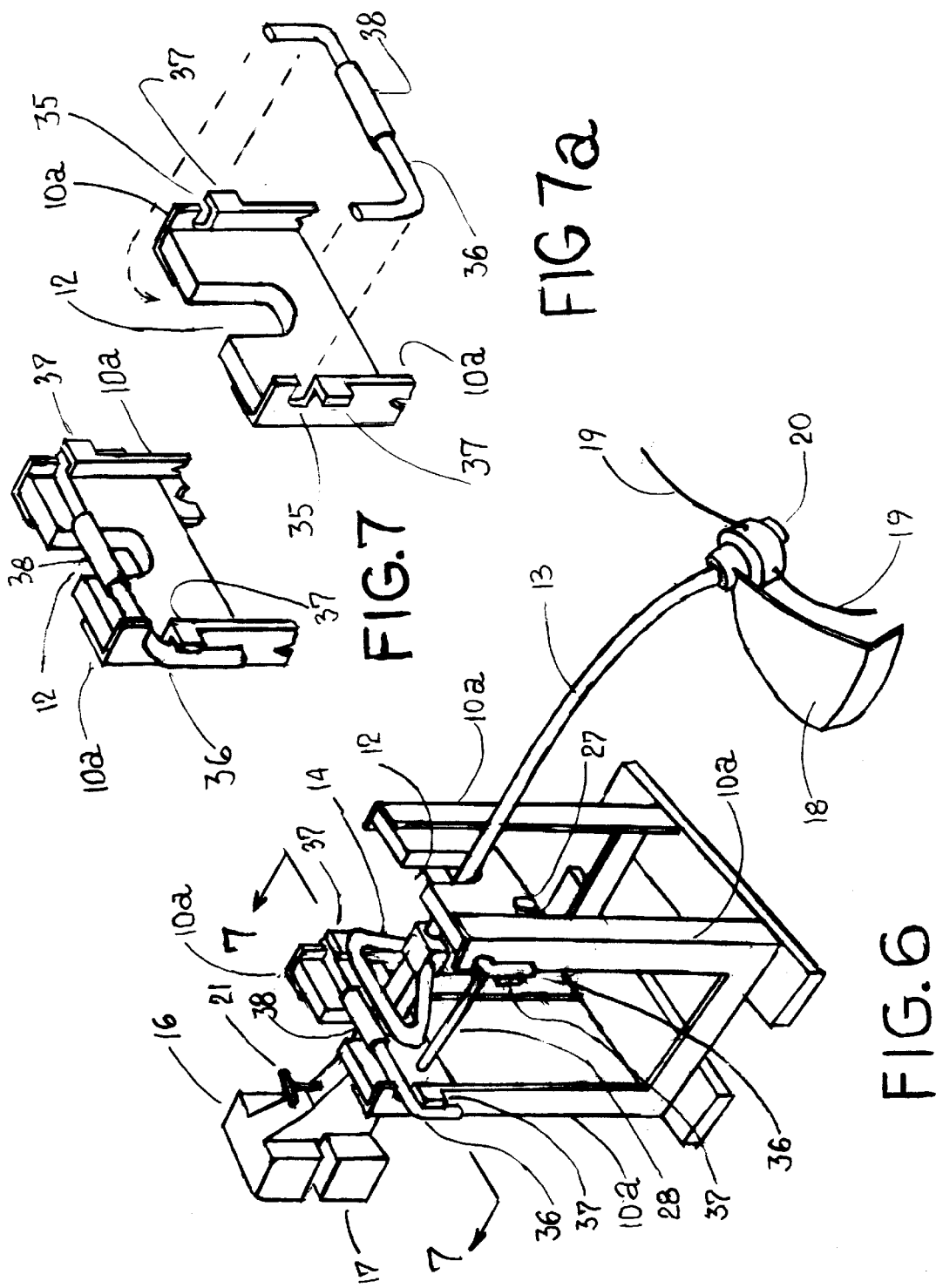

STAND FOR GASOLINE LINE TRIMMERS

FIELD OF THE INVENTION

The present invention relates to a removable and relockable supporting device for gasoline powered line trimmers to be used during their engine starting and fueling operations in order to facilitate and to avoid existing hazards of injuries to the users during said operations.

BACKGROUND OF THE INVENTION

Use of line trimmers, consisting of an engine, which rotates the head with one or two attached and sufficiently extended plastic cords, which due to the very fast rotation cut easily the grass, are in the common use today. There are two basic types of trimmers, one with electric engine and limited length of electric cord and another one, cordless, with gasoline powered engine, to which the present invention is related. Starting of such engines is not simple, many times is not successful, and often requires a repetition of necessary procedure. Manufacturer's instructions for engine starting are to rest the trimmer directly on the ground, squeeze and hold with one hand the throttle trigger pressing the trimmer itself against the ground and in the same time with other hand pull starter rope sharply several times until engine runs. Also, warning by manufacturer is added that the trimmer head with cords will rotate while starting engine, and hot muffler can cause serious burns. Following the above instructions, I found myself, by my own experience, that this method is very unsafe, hazardous, difficult and damaging to the trimmer. Kneeling and pressing heavily on the trimmer with one hand down to the ground, with one finger squeezing and holding the throttle trigger and in the same time with other hand pulling repeatedly starter rope is very difficult and dangerous job. Rotating cords may cause injury and hot muffler burns in case that the trimmer under pressure or repeated pulls shifts accidentally. Also plastic fuel tank directly exposed to the ground under pressure may be damaged or punctured by sharp stone and cause dangerous gasoline leak. Some of users prefer for engine starting operation to hold the trimmer with one hand in the air and to pull starter rope with other hand, which method is obviously much more difficult, and more exposed to possible injuries. Fueling of the trimmers represent also the problem, keeping the trimmer on the ground in an unstable position with the fuel tank and fuel cup in a vertical position for fueling is difficult and the trimmer may easily overturn resulting in gasoline spills, It will be understood that there is a need for a new solution which provides a removable support to hold and to capture the trimmer securely in place in an elevated position to avoid: need for kneeling and hazards of juries from rotating cord lines and from hot muffler to the users and to facilitate operation of engine starting and fueling.

SUMMARY OF THE INVENTION

The present invention is a removable supporting stand for gas powered line trimmers consisting of two vertical members axially positioned to each other and secured to an adequate horizontal base arrangement to provide stability and to prevent overturning. Vertical members have on their tops seat-like aligned notches with locking devices to support and to capture trimmer tube, holding the trainer itself in an approximate horizontal position. Vertical members are of sufficient height to keep engine, shield, and rotating cords clear of the ground and to enable user to reach throttle trigger and starter rope by hand without kneeling. Vertical members are positioned on an adequate distance to have middle portion of trimmer with handle and throttle trigger in between said supports, engine on one and shield on the other side, opposite to each other, which by their weights hold the trimmer placed on the stand in a gravity stable and balanced position keeping starter rope in upward position to facilitate pulling required to start the engine. Engine starting with trimmer on the new stand is much easier and safer with one leg pressing down to the horizontal base, with one hand holding the tube and squeezing the throttle trigger and with other hand pulling vertically the starting rope. Cutting line rotate freely without hitting the ground or, accidentally, the user. Engine and fuel tank is free in air and is not exposed to any pressure. Also, per manufacturer instruction requires the user to allow engine to run short time before moving choke lever to off position prior to starting of grass cutting is much easier and safer performed with trimmer left on the new stand. Use of trimmers, usually for the specific areas is combined with use of regular grass mowers and transportation of trimmers placed and locked on the new stand using trimmer handle is very convenient and leaving them temporarily on the stand is much better than leaving them directly on the ground Another convenience of use of the new stand is easier and safer fueling. Plastic gasoline tank, shaped as a square bottle with the cap on the top, is positioned horizontally underneath the engine. With new method, trimmer should be placed on the new stand and rotated about ninety degrees until gasoline tank, with cap on the top, becomes vertical, having trimmer handle partially below the supports located on the top of the vertical members. In this position longitudinal bar should be inserted through the holes from on to another vertical member and through the trimmer handle, capturing and holding said handle and the trimmer itself with gasoline tank in the described position against the gravity forces of the engine and shield which intend to rotate the trimmer back. This arrangement provides a very stable position for already elevated gasoline tank, necessary for fueling. Instead of longitudinal bar, the same effect may be accomplished by use of a relockable vertical tie brace secured on the lower end by a hinged connection to the base of the stand and equipped with conventional hook-like device on upper end to capture the trimmer handle and hold the trimmer with gasoline tank in the above described fueling position.

An important object of this invention is to provide a removable support for gasoline powered line trimmers which will hold securely and hazardless said trimmers facilitating the pulling of the starter rope and other operations required to start the engine.

Another object of invented removable support is to capture and hold said trimmer in elevated position avoiding interference of rotating cord lines with the user and the ground and therefore to provide safer conditions during engine starting operations.

Another object of this invention is to hold and keep gasoline tank in a suitable position for fueling.

An additional object of this invented stand is to serve as a holder for transportation of trimmers during use and storage.

BRIEF DESCRIPTION OF DRAWINGS

FIG. 1 is an isometric view of the trimmer in a gravity stable position, secured on the novel removable stand. Locking devices, for clarity are not shown.

FIG. 2 is an enlarged side elevational view taken along line 2—2 of FIG. 1, which illustrates locking device in closed position FIG. 2a is the same view of FIG. 2 which shows locking device in open position FIG. 3 is elevational view of the stand showing trimmer with gasoline tank and cup in a fueling position secured by a retractable longitudinal bar inserted through the vertical members and trimmer handle.

FIG. 4 is an enlarged side elevational view taken along line 4—4 of FIG. 3, which illustrated trimmer handle captured by a retractable bar holding gasoline tank in a vertical position for fueling.

FIG. 5 is an elevational view of the stand with the trimmer secured in the fueling position by an alternate method of capturing trimmer handle with a relockably removable vertical tie brace.

FIG. 6 is an isometric view of the trimmer on a preferable stand captured by the gravity relockable device.

FIG. 7 is an enlarged side elevational view taken along line 7—7 of FIG. 6, which illustrates gravity relockable device in closed position, and FIG. 7a is the same view of the FIG. 7 with relockable device in open position.

DETAILED DESCRIPTION OF THE PREFERRED EMBODIMENT

FIG. 1 shows trimmer placed on the novel removable stand, which consists of two vertical members 10 axially positioned to each other and securely attached to the adequate horizontal base 11, as a hole, to prevent overturning of said stand. Vertical members 10 have at their tops notches 12 with relocking devices, which are not shown in FIG. 1, for clarity, are able to accommodate, capture, and support trimmer tube 13. Said members 10 are spaced on a predetermined distance to have trimmer handle 14 and throttle trigger 15 between said notches 12 with trimmer engine 16 and gasoline tank 17 on one side and trimmer shield 18 with head 20 and cords 19 on other side of the support as shown in FIG. 1. Trimmer on the stand as shown in FIG. 1 is in the self taking gravity position, keeping vertical starter rope 21 upward and other engine starting gauges in an easily accessible operating position.

FIG. 2 is an enlarged partial elevation of the member 10 as indicated on FIG. 1, illustrates modified conventional relockable device 22 as whole, in a closed position with trimmer handle 14., engine 16 and gasoline tank 17 beyond. FIG. 2a is the same partial elevation shown in FIG. 2 and illustrates said relockable device 22 as whole in an open position allowing trimmer removal. Relockable device 22 as a whole consists of an longitudinal "L"-shaped bar 23 slidably but snugly captured by two round supports, 24a and 24b, secured to the vertical member 10 and one like hook-shaped flat bar 25 for holding end of the bar 23 in closed position. Round bar 23 has a small angular projection 26 larger than circular holes on support 24a and 24b to restrict a complete removal of the bar 23.

FIG. 3 shows trimmer on invented stand with gasoline tank 17 beyond, and cap 27 in a vertical position achieved by rotating trimmer approximately 90 degrees and holding the trimmer in the above described position against gravitational forces by capturing trimmer handle 14 with slidable rod 28 inserted through both vertical members 10 and through the trimmer handle 14. Retractable rod 28 of an adequate capacity has on one end knob like angular projection 29 and on other end pin 30 or other means of conventional gravity locking device to keep bar 28 between vertical member 10.

FIG. 4 illustrates enlarged side view of FIG. 4 showing trimmer handle 14 captured by slidable bar 28, holding trimmer gasoline tank 17 and cap 27 in a vertical position suitable for fueling.

FIG. 5 illustrates use of a vertical tie brace 31 instead of slidable bar 28, as an alternate method to capture trimmer handle 14 and to hold trimmer in fueling position. Tie brace 31 has, on the upper end, conventional hook like relockable arrangement 32 to capture trimmer handle 14 and is connected to the base of removable stand 11 by means of a conventional hinged support 33 to allow rotation of said brace. Tie brace 31 may be made of a flexible material also with built in height adjustment if required.

FIG. 6 illustrates another preferred embodiment of the present invention and shares many features in common with embodiment shown in FIG. 1. New embodiment shown in FIG. 6 is equipped as an alternate with gravity relockable capturing device, which consists of two horizontal slots 35 and one like "U"-shaped bar 36 shown in FIG. 7a, Slots 35 are axially positioned to each other and are located on the upper portion of the vertical members 10a which are alternates to members 10 in embodiment shown in FIG. 1.

Each slot 35 at its open end and below its soffit has a perpendicular outside oriented rectangular projection 37. Distance from projection 37 to end of slot 35 is slightly larger than the diameter of rod 36. And width of slot 35 is adequate to provide free but snug insertion of rod 36 in slot 35. Rod 35 has clear distance between perpendicularly projected ends sufficient to provide free but snug ride of rod 36 over vertical member 10 is illustrated in FIG. 7a, which indicates locking procedure. Rod 36, with elevated position of projected ends is inserted into the end of slots 35, and is rotated down to take its gravity position against projections 37, restricting any movement of rod 36, capturing and holding trimmer tube 13, which for clarity is not shown, in a stable locked position as illustrated in FIG. 7. To relock tube 13 is obviously a repeated procedure. Rod 36 has in center portion collar 38, made of softer material for protection of trimmer tube.

Returning now to FIG. 1 will there be seen that the vertical members 10 are secured to base 11 by the conventional "L"-shaped steel brackets 34. They are used to indicate more obviously need for an adequately strong connection of base 11 with vertical members 10. For commercial purposes, such a connection may be modified to be hinged to facilitate shipping or may be manufactured in parts for customer assembly. Also, instruction for engine starting operations and safety warnings may be illustrated on the convenient surfaces of the new support as an additional benefit to the users. New removable support may be made of wood with combination of metal aluminum or plastic parts.

It will be understood that various modifications may be adapted in the construction of the removable trimmer support without parting from the spirit of the invention or of the scope of the following claims.

What I claim as my invention is:

1. A combination comprising a removable capturing means incorporated with a self-standing supporting device for holding a gas powered line trimmer in positions suitable for fueling or engine starting operations of said trimmer wherein said self-standing supporting device comprises a stable base structure with two sufficiently elongated vertical members axially positioned to each other at a predetermined distance and having on their tops one axially aligned seat-like provision and a releasably lockable arrangement adapted to capture and support a trimmer tube having a trimmer handle with a throttle trigger located in between said vertical members and having an engine with an upward oriented starting rope on one side of said vertical members and a head with a shield on the opposite side of said vertical members in a gravity stable position above the ground at an elevation accessible for easy and safe trimmer manipulation by a standing user, and wherein said removable capturing means is adapted to keep the trimmer in a position suitable for fueling by resisting the rotation of the trimmer created by the gravitational force in said position and comprises a hole at a corresponding location on each of the vertical members accommodating insertion of a retractable rod through said holes and through a lowered trimmer handle, so as to capture and hold said handle and trimmer itself in a position which locates the gasoline tank with the cap on the top in a vertical position.

2. The combination according to claim 1, in which said releasably lockable arrangement is provided to hold the trimmer in a position suitable for engine starting operations and comprises two pipe-like gadgets located on one of the vertical members and axially positioned to each other at a predetermined distance, allowing free but snug sliding of an inserted straight rod, wherein said rod has at an adequate location an angular projection to restrict withdrawal of said rod in the open position of said arrangement and one 90 degree projected end captured in its gravity position by one hook-like bar located on the vertical member to restrict movement of said bar in the closed position of said arrangement.

3. The combination of claim 2, wherein said retractable rod further comprises an angular knob-like projection on one end and a conventional gravity lock on the other end.

4. The combination according to claim 1, in which said releasably lockable arrangement is provided for holding the trimmer in a position suitable for engine starting operations by resisting related uplift forces and comprises one straight rod with 90 degree projected ends having an inside distance between said ends to provide free but snug sliding of said rod over one of said vertical members and two horizontally aligned slots located on exposed ends of said vertical member having adequate width and depth to allow free but snug insertion of said rod in said slots and each having in front, below soffits of said slots, an outside perpendicularly oriented rectangular projection able to engage and support the projected ends of said rod in their gravity position restricting any movement of said inserted rod.

5. A combination comprising a removable capturing means incorporated with a self-standing supporting device for holding a gas powered line trimmer in positions suitable for fueling or engine starting operations of said trimmer wherein said self-standing supporting device comprises a stable base structure with two sufficiently elongated vertical members axially positioned to each other at a predetermined distance and having on their tops one axially aligned seat-like provision and a releasably lockable arrangement adapted to capture and support a trimmer tube having a trimmer handle with a throttle trigger located in between said vertical members and having an engine with an upward oriented starting rope on one side of said vertical members and a head with a shield on the opposite side of said vertical members in a gravity stable position above the ground at an elevation accessible for easy and safe trimmer manipulation by a standing user, and wherein said removable capturing means is adapted to keep the trimmer in a position suitable for fueling by resisting the rotation of the trimmer created by the gravitational force in said position and comprises a vertical tie brace hingedly connected to the base of said device and being equipped at an upper end thereof with a relockable gadget to capture the trimmer handle with the gasoline tank having the cap on the top in a vertical position.

\* \* \* \* \*